United States Patent
Ito

(10) Patent No.: US 6,850,341 B1
(45) Date of Patent: Feb. 1, 2005

(54) METHOD, SYSTEM AND RECORDING MEDIUM FOR IMAGE PROCESSING

(75) Inventor: Wataru Ito, Kaisei-machi (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 09/510,174

(22) Filed: Feb. 22, 2000

(30) Foreign Application Priority Data

Feb. 19, 1999 (JP) .......................................... 11-041444

(51) Int. Cl.⁷ ........................ H04N 1/387; H04N 1/409; H04N 1/58
(52) U.S. Cl. ...................... 358/1.9; 358/3.27; 358/527; 358/532; 358/537; 358/452
(58) Field of Search ................................ 358/1.9, 3.27, 358/531, 532, 537, 448, 452, 527; 382/254, 266

(56) References Cited

U.S. PATENT DOCUMENTS

| | | | | |
|---|---|---|---|---|
| 5,436,734 A | * | 7/1995 | Yamauchi et al. | ............ 358/1.9 |
| 5,757,378 A | * | 5/1998 | Ikeda | .......................... 345/591 |
| 5,835,627 A | * | 11/1998 | Higgins et al. | ............. 382/167 |
| 6,202,073 B1 | * | 3/2001 | Takahashi | ................... 715/517 |

FOREIGN PATENT DOCUMENTS

| | | |
|---|---|---|
| EP | A2843284 | 5/1998 |
| JP | A9114853 | 5/1997 |

* cited by examiner

Primary Examiner—Scott A. Rogers
(74) Attorney, Agent, or Firm—Birch, Stewart, Kolasch & Birch, LLP

(57) ABSTRACT

Image processing according to a sensation expression can be carried out regardless of differences in output media or viewing conditions. An editing instruction for image data is generated by editing instruction means in a personal computer according to a sensation expression such as "sharpness" or "softness". At this time, the content of image processing is corrected and according to a characteristic of a monitor of the personal computer by input condition setting means and displayed on the monitor. The result of the editing instruction is transferred to a laboratory as a general sensation expression script. In the laboratory, image processing is carried out on image data according to the general sensation expression script. At this time, output condition setting means changes the degree of image processing according to the characteristic of an output medium for processed image data and the like. The processed image data are then output by output means to the predetermined output medium.

10 Claims, 4 Drawing Sheets

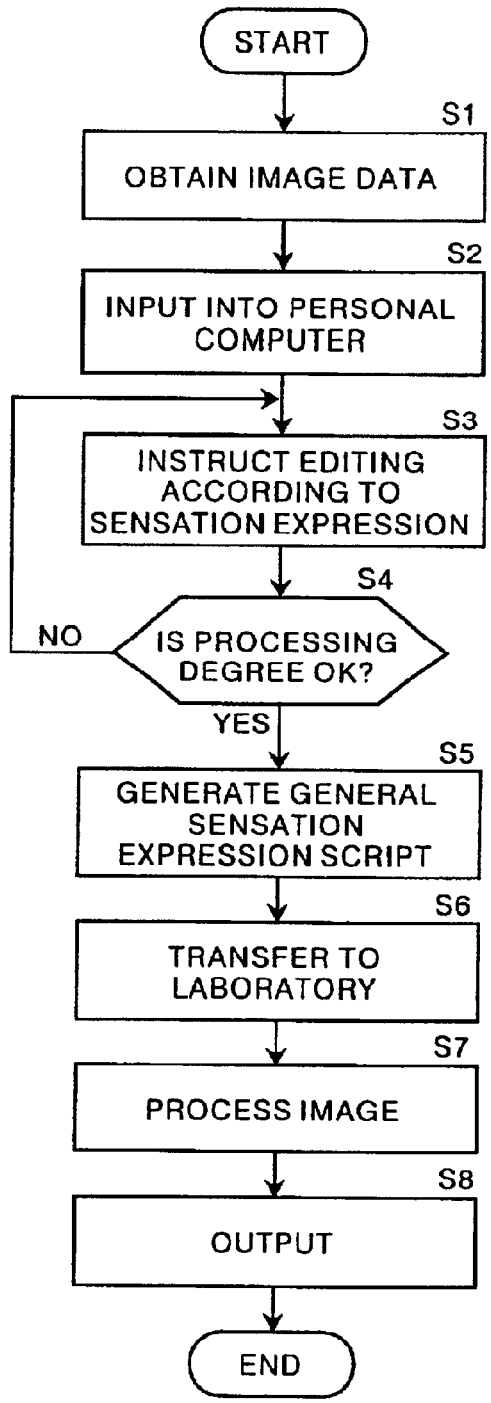

FIG.5a shori (SHARPNESS, 10)

FIG.5b
```
shori (kansei, ryou)
{
    switch (kansei) {
        case "SHARPNESS" : sharp (ryou) ; break ;
        case "SOFTNESS" : yawarakai (ryou) ; break ;
        ......
    }
}
```

METHOD, SYSTEM AND RECORDING MEDIUM FOR IMAGE PROCESSING

BACKGROUND OF THE INVENTION

1. Field of the Invention

The present invention relates to an image processing method and an image processing system for carrying out image processing on image data according to the content of the processing described by a sensation expression such as "sharp" or "soft", and also to a computer-readable recording medium storing a program to cause a computer to execute the processing in the image processing system.

2. Description of the Related Art

A printing service for generating postcards, calendars, T-shirts and the like using photographs obtained by a user has been known. In such a service, a negative film or a print deposited by a user is digitized in a laboratory and printing is carried out after image processing desired by the user is carried out. As the image processing in this case, layout determination, trimming, and combining the image with characters, as well as tone processing, color conversion processing and the like can be listed. In order to carry out such processing as the user wishes, the following method has been known. In this method, the image data obtained in the laboratory are provided to the user and the user carries out desired image processing on his/her personal computer by using predetermined software, while viewing the image. The content of the image processing is recorded in a recording medium or transferred to the laboratory via a network, and the laboratory carries out the processing on the image data, based on the content of the processing generated by the user. At this time, in order to exchange the image data, a large-capacity recording medium such as an MO disc or a ZIP disc is used. In order to exchange image data via a general recording medium such as an FD, a printing method in which image data at a low resolution are provided to a user and image data at a high resolution are processed only in a laboratory has been proposed (Japanese Unexamined Patent Publication No. 10(1998)-200730).

Meanwhile, an impression of an image can be expressed by using a sensation expression such as "sharp", "soft", "warm", and "cold". In this case, in order to search a plurality of images for a desired image corresponding to a sensation expression, a search apparatus has been proposed (Japanese Unexamined Patent Publication No. 9(1997)-114853). In this apparatus, a plurality of images are related to characteristic values representing the content of processing based on sensation expressions of the images and recorded therein. The characteristic value corresponding to the user's sensation expression is calculated based on the sensation expression, and the image is searched for according to the characteristic value having been calculated.

In the printing method described above, users wish to carry out image processing for changing impressions of images according to sensation expressions such as "sharp", "soft" and "bright". In this case, an image on which image processing according to a sensation expression has been carried out can be obtained. As has been described in Japanese Unexamined Patent Publication No. 9(1997)-114853, images and the characteristic values are related to each other and correspondence between a sensation expression and the content of image processing represented by the sensation expression is found. According to the content of the image processing having been found, the processing is carried out on image data. Furthermore, as in a method described in Japanese Unexamined Patent Publication No. 10 (1998)-200730, the content of the image processing corresponding to the sensation expression may be transferred to a laboratory so that printing is carried out after the processing is carried out on image data.

However, an impression of an image is different between output media such as a monitor of a personal computer owned by a user and a print generated in a laboratory, even if image processing according to the same sensation expression has been carried out on the image. For example, a monitor is a medium using light emission and a print is a medium using light reflection. Therefore, an impression of an image becomes different between the two media, even if the same image processing has been carried out on the image. Furthermore, even if the same image processing has been carried out, a glossy print looks sharp while a print on matt photographic paper looks soft. Moreover, the impression of an image is different between viewers and between environments in which the image is viewed.

SUMMARY OF THE INVENTION

The present invention has been conceived based on consideration of the above problems. An object of the present invention is therefore to provide an image processing method and an image processing apparatus for carrying out image processing according to a sensation expression without changing a sensational impression of an image even if an output medium and an image viewing condition change, and to provide a computer-readable recording medium storing a program to cause a computer to execute the image processing method.

An image processing method of the present invention comprises the steps of:

instructing editing according to a sensation expression of an image;

generating a general sensation expression script based on the editing instruction; and obtaining processed image data by carrying out image processing on image data representing the image, based on the general sensation expression script.

The "editing instruction according to a sensation expression" means the content of an editing instruction on an image for enhancing sharpness, emphasizing softness, or increasing brightness based on a sensation expression such as "sharpness", "softness", "warmth", "coldness" or "brightness", for example.

The "general sensation expression scripts" means a script representing the content of the editing instruction and excluding an effect caused by a variance of image impression due to a sensation of a person generating an editing instruction for an image or a condition of viewing the image for which the editing instruction is being generated, (hereinafter, called an editing environment), and the like.

It is preferable for the image processing method of the present invention to carry out image processing on the image data, based on an output condition used at the time of outputting the processed image data.

The "output condition" herein referred to means a condition affecting an impression of an output image, such as a characteristic of an output medium used for outputting the processed image data, the editing environment, and a characteristic of each viewer of the output image.

An image processing system of the present invention comprises:

editing instruction means for instructing editing for an image, based on a sensation expression of the image;

script generating means for generating a general sensation expression script based on the content of the editing instruction; and image processing means for obtaining processed image data by carrying out image processing on image data representing the image, based on the general sensation expression script.

In the image processing system of the present invention, it is preferable for the image processing means to carry out image processing on the image data based on an output condition used at the time of outputting the processed image data.

An editing instruction apparatus of the present invention comprises:

editing instruction means for instructing editing for an image based on a sensation expression; and script generating means for generating a general sensation expression script based on the content of the editing instruction.

An image processing apparatus of the present invention comprises image processing means for obtaining processed image data by carrying out image processing on image data representing the image, based on the general sensation expression script obtained by the editing instruction apparatus of the present invention.

In the image processing apparatus of the present invention, it is preferable for the image processing means to carry out image processing on the image data based on an output condition used at the time of outputting the processed image data.

The processing carried out by the image processing system of the present invention may be provided as a program recorded in a computer-readable recording medium to cause a computer to execute the processing.

According to the present invention, the general sensation expression script is generated based on the content of the editing instruction according to a sensation expression, and image processing is carried out based on the general sensation expression script. Therefore, image processing can be carried out on the image data according to the content of the image processing excluding a variance of how the image looks depending on the editing environment. In this manner, it is possible to obtain the processed image data representing the image not affected by an impression of the image depending on the editing environment.

Furthermore, by carrying out image processing based on the output condition at the time of outputting the processed image data, the processed image data representing the image giving the same impression as at the time of editing can be obtained by considering a characteristic of the output medium to output the processed image data, the viewing environment, and a characteristic of each viewer of the output image, for example.

BRIEF DESCRIPTION OF THE DRAWINGS

FIG. 4 is a flow chart showing an operation of the embodiment of the present invention; and FIGS. 5a and 5b are programs using functions carrying out image processing.

DESCRIPTION OF PREFERRED EMBODIMENT

Hereinafter, an embodiment of the present invention will be explained with reference to the accompanying drawings.

Figure 1:
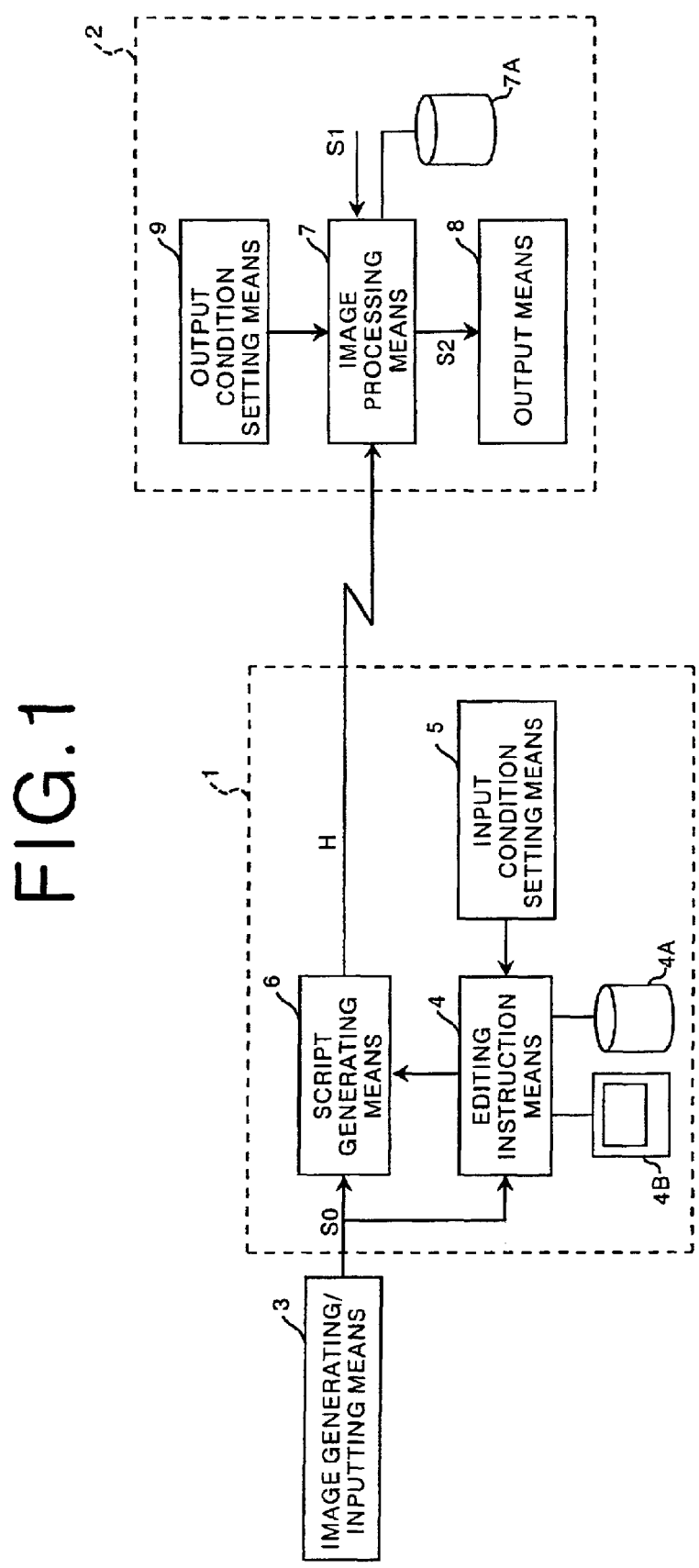
FIG. 1 is a block diagram showing an outline configuration of an image output system according to an embodiment of the present invention.

FIG. 1 is a block diagram showing an outline configuration of an image output system to which an image processing system according to the embodiment of the present invention is applied. As shown in FIG. 1, the image output system according to the embodiment of the present invention generates an editing instruction using a sensation expression for image data S0 by using a personal computer 1 of a user, generates a general sensation expression script H based on the content of the editing instruction, transfers the script to a laboratory 2, and outputs an image in the laboratory by carrying out image processing on image data S1, based on the general sensation expression script.

The personal computer 1 comprises editing instruction means 4 for instructing the editing based on the sensation expression for the image data S0 generated by image generating/inputting means 3, input condition setting means 5 for setting an input condition for the image data S0 at the time of instructing the editing by using the editing instruction means 4, and script generating means 6 for generating the general sensation expression script H based on the content of the editing instruction generated by the editing instruction means 4. The processing carried out by the editing instruction means 4, the input condition setting means 5, and the script generating means 6 is carried out by using a CPU, a memory, and a monitor, according to a program installed in a hard disc of the personal computer 1.

As the image generating/inputting means 3, a digital camera for obtaining the image data S0 by photographing, or a computer graphics generating apparatus can be used. The image generating/inputting means 3 may be a reading apparatus for obtaining the image data S0 by reading a film brought in by a user by using a scanner in a laboratory 2. If the image generating/inputting means 3 is the reading apparatus in the laboratory 2, the image data S0 may be image data at a low resolution generated by reducing the number of pixels of image data at a high resolution obtained by reading. In this case, the image data S0 are provided to the user by being recorded in a recording medium such as an MO disc, a ZIP disc, a CD-R, or an FD by the laboratory 2. Alternatively, the image data S0 may be transferred from the laboratory 2 via a network. In this embodiment, the image data S0 at a low resolution are generated from the high resolution image data S1 obtained by a reading apparatus (not shown in FIG. 1) of the laboratory 2, and the low resolution image data S0 are transferred to the personal computer 1 of the user via the network. The high resolution image data S1 are stored in the laboratory 2.

The editing instruction means 4 generates the editing instruction based on a sensation expression such as "brighter" or "merrier". An input to the editing instruction means 4 is carried out by using input means such as a keyboard and a mouse installed in the personal computer 1. The editing instruction means 4 has a database 4A, and the database 4A stores the content of image processing and sensation expressions related thereto. For example, "sharpness" is related to frequency enhancement processing and hard tone processing, and "coldness" is related to saturation reduction processing and hue changing processing from warm colors into cold colors. "Softness" is related to frequency lowering processing, hue changing processing from cold colors into warm colors, and soft focus processing.

The input condition setting means 5 has correction data for correcting a variance of characteristics of a monitor 4B of the personal computer 1, viewing environments in which the monitor 4B is viewed, and user's sensation expressions. The input condition setting means corrects the image data S0 based on the correction data at the time of instructing the editing.

The script generating means 6 generates the general sensation expression script H having a quantitative character from the sensation expression, based on the editing instruction from the editing instruction means 4 and without considering the correction by the input condition setting means 5. The general sensation expression script H is then transferred to the laboratory 2 via the network. If the image generating/inputting means 3 is a digital camera or a computer graphics generating apparatus, the image data S0 and the general sensation expression script H are transferred to the laboratory 2. In this case, the general sensation expression script H alone or as well as the image data S0 may be recorded in a recording medium such as an MO disc, a ZIP disc, a CD-R, or an FD, and sent to the laboratory 2.

Figure 2:
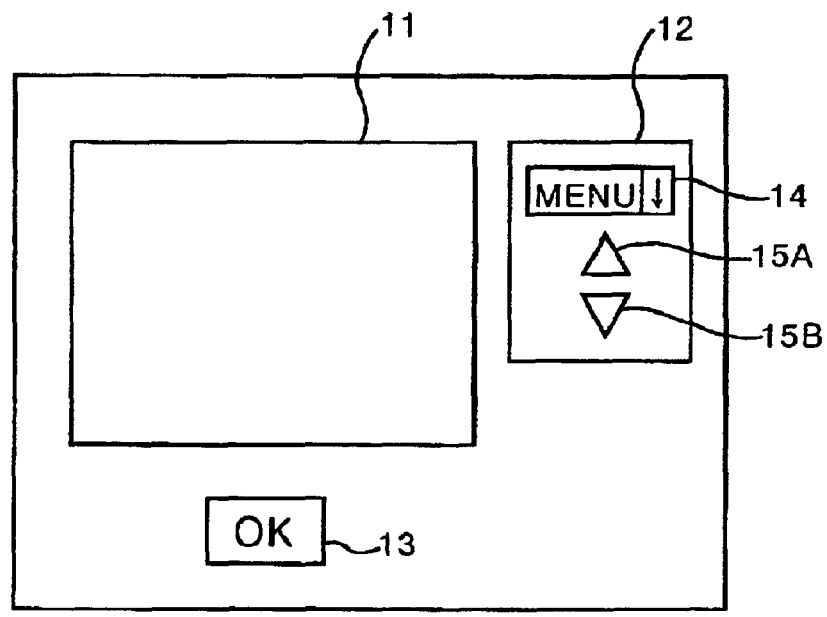
FIG. 2 is an illustration showing a monitor screen at the time of instructing editing.

An operation of the editing instruction means 4, the input condition setting means 5 and the script generating means 6 will be explained next. FIG. 2 is an illustration showing a display screen of the monitor 4B at the time of generating the editing instruction. As shown in FIG. 2, an image window 11 for displaying an image, an instruction window 12 for instructing the editing, and an OK button 13 for confirming the editing instruction are shown on the monitor 4B of the personal computer 1 at the time of generating the editing instruction. In the instruction window 12, a pull-down menu 14 is displayed. By clicking the portion shown by the arrow in FIG. 2, a menu according to the sensation expressions such as "sharpness", "cold", "softness", "hardness", "brightness", "merriness", "lightness", "warmth", and "fineness" is displayed. By clicking a desired menu, the menu can be selected. Buttons 15A and 15B are displayed below the pull-down menu, in order to change the degree of an effect of the image processing corresponding to the selected menu.

The image window 11 shows the image represented by the image data S0. By selecting a desired menu and clicking the button 15A, the degree of the image processing effect according to the selected menu is increased by 1 step, while it is decreased by 1 step by clicking the button 15B. In this manner, the image window 11 shows an image on which the image processing corresponding to the selected menu and according to the degree having been set has been carried out. At this time, the input condition setting means 5 corrects an image processing amount per click of the buttons 15A and 15B, based on the color temperature of the monitor, the viewing environment, the resolution of the monitor, a visibility angle per dot, and the like. The corrected image is then displayed on the image window 11.

In this case, since the sensation expression for the image and the impression of the processing according to the sensation expression differ from person to person, the user inputs a degree of satisfaction with the image after processing after display of the processed image. By accumulating the data, differences between the sensation expressions by users and the content of the processing stored in the database 4A are learned. According to this learning result, the degree of the image processing and the content thereof may be changed when the image is displayed in the image window 11.

If the image displayed in the image window 11 is satisfactory, the user clicks the OK button 13. If the degree of the processing effect needs to be changed, the user changes the degree by clicking the button 15A or 15B. Once the OK button 13 is clicked, the script generating means 6 generates the general sensation expression script H.

Figure 3:
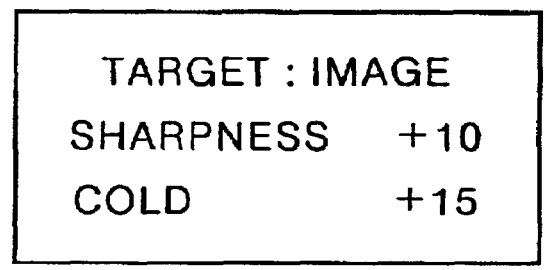
FIG. 3 is an illustration showing en example of a general sensation expression script.

The general sensation expression script H is a text file shown in FIG. 3, for example. In the example shown in FIG. 3, the content of the image processing to be carried out on an image is to increase the degrees of sharpness and cold by 10 and 15 points, respectively. The values of the general sensation expression script H are changed by how many times the button 15A or 15B has been clicked. For example, 5 points are gained by 1 click. The values do not include the correction amount according to the correction data generated by the input condition setting means 5. Therefore, the general sensation expression script H shows the degree of image processing according to the general sensation expression excluding the correction amount according to the characteristic of the monitor, the viewing environment, or the characteristic of the user.

The laboratory 2 comprises image processing means 7 for obtaining processed image data S2 by carrying out image processing on the high resolution image data S1 stored in the laboratory 2, output means 8 such as a printer for outputting the processed image data S2 or a recording apparatus for recording the processed image data S2 in a recording medium, and output condition setting means 9 for setting an output condition of the output means 8 upon image processing.

The image processing means 7 has a database 7A storing the sensation expressions and the content of image processing related to the sensation expressions, as the database 4A of the editing instruction means 4. Based on the general sensation expression script H, the image processing means 7 carries out image processing on the image data S0 based on the general sensation expression script H with reference to the database 7A, and obtains the processed image data S2.

The output condition setting means 9 retains correction data for correcting a variance due to a characteristic of an output medium for the processed image data S2, an environment in which the processed image data S2 are viewed, the characteristic of the viewer, and the like. The image processing means 7 changes the degree of the image processing effect upon processing the image data, based on the correction data. For example, if the output medium is a white glossy mug, the content of the image processing is corrected so as not to increase the degree of "cold" even if the general sensation expression script H instructs an increase in "cold". This is because the output medium itself gives a cold impression. Upon printing of a photograph on glossy photographic paper, the content of the image processing is corrected so as not to increase the degree of "sharpness" or "cold" even if the general sensation expression script H instructs an increase in "sharpness" or "cold". This is because the output medium itself gives a sharp and cold impression. For the case of a matt print, the content of the image processing is corrected so as not to increase the degree of "softness" even if the instruction indicates an increase in softness, because the output medium itself gives a soft impression. Furthermore, when a plurality of photographs are printed on one sheet and photographs surrounding one photograph among the photographs are bright, the content of the image processing is corrected to increase the degree of "brightness" of the photograph much higher than the degree instructed by the general sensation expression script H. In this manner, the image does not look dull compared with the surrounding images. In this case, if the input condition setting means 5 has learned the characteristic of the viewer, that is, the user, the result of learning may be input to the output condition setting means 9 so that the degree of the image processing effect can be changed based on the result.

An operation of this embodiment will be explained next. FIG. 4 is a flow chart showing the operation. The image generating/inputting means 3 obtains the image data S0 (Step S1), and inputs the data into the personal computer 1 (Step S2). The editing instruction means 4 instructs the editing for the image data S0 according to the sensation expression (Step S3). At this time, as has been described above, the degree of the image processing effect is changed based on the correction data retained by the input condition setting means 5 and the image having been subjected to the image processing is displayed in the image window 11 of the monitor. If the processing on the image displayed in the window 11 is satisfactory (Step S4), the script generating means 6 generates the general sensation expression script H (Step S5), and transfers the script to the laboratory 2 (Step S6). The above is the operation carried out in the personal computer 1.

In the laboratory 2, based on the general sensation expression script H having been transferred thereto, image processing is carried out on the high resolution image data S1 stored therein, and the processed image data S2 are obtained (Step S7). At this time, as has been described above, the degree of the image processing effect is changed based on the correction data retained by the output condition setting means 9. The processed image data S2 are then output to a predetermined output medium by the output means 8 (Step S8), and the operation is completed.

As has been described above, according to the embodiment, image processing is carried out on the image data S1 based on the general sensation expression script H. Therefore, the processing excluding the variance of how an image looks depending on the editing environment such as the user to edit or the condition of viewing the monitor of the personal computer 1 can be carried out on the image data S1. In this manner, it is possible to obtain the processed image data S2 representing the image not affected by an impression of the image due to the editing environment.

Furthermore, since the image processing is carried out according to the output condition at the time of outputting the processed image data S2, the processed image data S2 representing the image having the same impression as the image at the time of editing can be obtained by taking into consideration the characteristic of the output medium, the viewing environment, and the characteristic of the viewer of the output image.

In the above embodiment, the sensation expressions are related to the content of image processing and stored in the databases 4A and 7A of the editing instruction means 4 and the image processing means 7. By referring to the databases, image processing is carried out on the image displayed on the monitor 4B and on the output image. However, the image processing may be carried out by using an image processing function having the sensation expression as an argument. In this case, the image processing function corresponding to the sensation expression instructed by the general sensation expression script H is read and the image processing is carried out according to the image processing function based on a correction amount representing the degree of the image processing effect set by the buttons 15A and 15B. Examples of a program using such image processing functions are shown in FIGS. 5a and 5b. As shown in FIG. 5a, if the function is called by "shori(sharpness, 10), for example, "sharpness" is the argument in the general sensation expression script H and the amount of correction is 10. When the processing according to a program shown in FIG. 5b is carried out, if an argument "kansei" is sharpness, a function "sharp" carrying out frequency enhancing processing is called and the processing is carried out according to a correction amount "ryou" 10. If the argument kansei is "softness", a function "yawarakai" carrying out frequency lowering processing is called and the processing is carried out according to the correction amount "ryou".

In this case, if knowledge regarding the relationships between the sensation expressions and the content of image processing is improved and a function having higher performance is obtained, the program can be upgraded easily by replacing the function such as "sharp( )" and "yawarakai( )" with a function having higher performance. In order to carry out more sophisticated processing depending on a computer type, functions enabling higher performance can be used and image processing by the functions in accordance with the performance of the computer can be realized. By registering the functions in a dynamic link library (DLL)., the functions can be replaced by exchanging the DLL.

What is claimed is:

1. An image processing method comprising the steps of:
   instructing editing according to a sensation expression for an image;
   generating a general sensation expression script based on the content of the editing instruction;
   obtaining processed image data by carrying out image processing on image data representing the image, based on the general sensation expression script;
   displaying the image on a screen;
   receiving a user input indicating a desired processing effect for the displayed image wherein the sensation expression is based on the user input; and
   generating processed image data in accordance with said instructing to achieve said desired processing effect, said steps of displaying, receiving, instructing and generating being repeated until a suitable image display is achieved;
   wherein said displayed image is corrected based on input conditions affecting the user's perception of said displayed image, such that said general sensation expression script excludes correction amounts based on said input conditions.

2. The image processing method according to claim 1, wherein said input conditions include at least one of a display device characteristic, a viewing environment characteristic, and a user characteristic.

3. The image processing method according to claim 2, wherein said input conditions include a user characteristic derived during a learning operation.

4. An image processing system comprising:
   editing instruction means for instructing editing for an image according to a sensation expression;
   script generating means for generating a general sensation expression script based on the content of the editing instruction;
   image processing means for obtaining processed image data by carrying out image processing on image data representing the image, based on the general sensation expression script;
   a display device for displaying the image based on input image data;
   a user input device for receiving a user input indicating a desired processing effect for the displayed image, the editing instruction means instructing editing for the image based on said user input; and means for generating processed image data in accordance with said instructing to achieve said desired processing effect, said operations of displaying, receiving, instructing, and generating being repeated until a suitable image display is achieved;

wherein said displayed image is corrected based on input conditions affecting the user's perception of said displayed image, such that said general sensation expression script excludes correction amounts based on said input conditions.

5. The image processing system according to claim 4, wherein said input conditions include at least one of a display device characteristic, a viewing environment characteristic, and a user characteristic.

6. An editing instruction apparatus comprising:

editing instruction means for instructing editing for an image according to a sensation expression; and script generating means for generating a general sensation expression script based on the content of the editing instruction;

a display device for displaying the image based on input image data;

a user input device for receiving a user input indicating a desired processing effect for the displayed image; and means for generating processed image data in accordance with said instructing to achieve said desired processing effect, said operations of displaying, receiving, instructing, and generating being repeated until a suitable image display is achieved;

wherein said displayed image is corrected based on input conditions affecting the user's perception of said displayed image, such that said general sensation expression script excludes correction amounts based on said input conditions.

7. The image processing system according to claim 6, wherein said input conditions include a user characteristic derived during a learning operation.

8. A computer-readable recording medium storing a program to cause a computer to execute the procedures of:

instructing editing for an image according to a sensation expression;

generating a general sensation expression script based on the content of the editing instruction;

displaying the image on a display device based on input image data;

receiving a user input indicating a desired processing effect for the displayed image and instructing editing based on the user input; and generating processed image data in accordance with said instructing to achieve said desired processing effect, said steps of displaying, receiving, instructing, and generating being repeated until a suitable image display is achieved;

wherein said displayed image is corrected based on input conditions affecting the user's perception of said displayed image, such that said general sensation expression script excludes correction amounts based on said input conditions.

9. The invention according to claim 8, wherein said input conditions include at least one of a display device characteristic, a viewing environment characteristic, and a user characteristic.

10. The invention according to claim 9, wherein said input conditions include a user characteristic derived during a learning operation.

* * * * *